March 14, 1933.  F. D. CHAPMAN  1,901,084

PROCESS OF TREATING MATERIAL

Filed Jan. 19, 1931

INVENTOR.
F. D. Chapman
BY
Morrell & Morrell
ATTORNEY.

Patented Mar. 14, 1933

1,901,084

UNITED STATES PATENT OFFICE

FRANK D. CHAPMAN, OF BERLIN, WISCONSIN

PROCESS OF TREATING MATERIAL

Application filed January 19, 1931. Serial No. 509,734.

The present invention relates in general to improvements in the art of heating or otherwise treating various kinds of material, and relates more specifically to an improved process of controlling the degree of agitation of food products during heat treatment thereof and after batches of the substance have been packed in containers.

Generally stated, an object of the invention is to provide an improved method of agitating and of controlling the degree of agitation of fluent substances such as foods packed in containers, during treatment of the product.

The art of cooking, sterilizing and otherwise heat treating edible commodities after batches of the same have been hermetically sealed in containers such as cylindrical tin cans or glass jars, has presented many perplexing problems due to the varying characteristics of different materials, and even of the same classes of material under variable conditions of growth, production, age and treatment thereof. Ordinarily, the purpose of such treatments is to place the product in palatable condition and to kill objectionable bacteria, and the processing operation must usually be accomplished quickly and effectively. The product treated should not be detrimentally affected by the treatment and must therefore be maintained in its natural condition as to color, taste and otherwise, throughout the treating operation and thereafter. In order to avoid deterioration of the product due to sudden overheating, heating for a prolonged period of time, or otherwise, it is frequently desirable to agitate the batches either during the entire treating operation or during predetermined periods thereof so as to enable most efficient transfer of the heat.

Prior to the present invention, it was proposed to heat treat liquid foods such as milk, after batches thereof had been placed in cylindrical tin cans, by first subjecting the successive cans to initial heating so as to bring the temperature of the material up to a desired point, by subsequently additionally heating the canned product under pressure to effect sterilization, and by finally cooling the heat treated batches in a special cooler. With this prior process, a relatively long initial heating or "bringing up" time was required in order to prevent destruction of the product or of the cans, and this long bringing up period resulted in discoloring, carnelization, or other deterioration of the milk. The heating medium utilized under this prior process, was pure water with a specific gravity and a specific heat of unit, and with a boiling point of 212° F. thus making it necessary to employ a long bring up period and also making it essential to finally heat treat the batches under pressure, since the temperatures necessary for sterilization are ordinarily far beyond the boiling point of water. While it was customary with this prior process to agitate the cans during certain portions of the treatment, it was difficult to vary the degree of agitation in accordance with requirements.

It has been discovered that if cylindrical food laden cans are submerged in a liquid having a predetermined specific gravity, the cans will either tend to float or sink depending upon the relationship between the specific gravity of the submerging liquid and that of the packed cans. If the submerging liquid has a specific gravity higher than that of the food laden cans, the cans will tend to float, whereas a reduction in specific gravity of the submerging liquid below that of the food laden cans, will cause the cans to sink in the liquid. Utilizing this discovery it is possible to employ a heat treating solution consisting of a basic liquid mixed with water which will either float the food laden cans or which will permit such cans to sink in the treating liquid, in connection with a transporting rotor such as is ordinarily used in the cooking and sterilizing treatment of food laden cylindrical cans, for the purpose of varying and of controlling the degree of agitation of the batches of product. The degree of agitation may be made more violent during a certain portion of the submergence of the cans in the heating liquid, than during other portions of said submergence, and agitation may be eliminated entirely by properly regulating the density of the heating medium.

In view of the foregoing discovery, it is a more specific object of the present invention to provide a highly flexible process whereby the degree of agitation and the time of agitation of batches of material packed in cylindrical containers may be readily varied so as to permit most efficient treatment of the contents of the containers.

A clear conception of the procedure involved in the present improved method, may be had by referring to the drawing accompanying and forming part of this specification in which like reference characters designate the same or similar parts in the several views.

Figure 3:
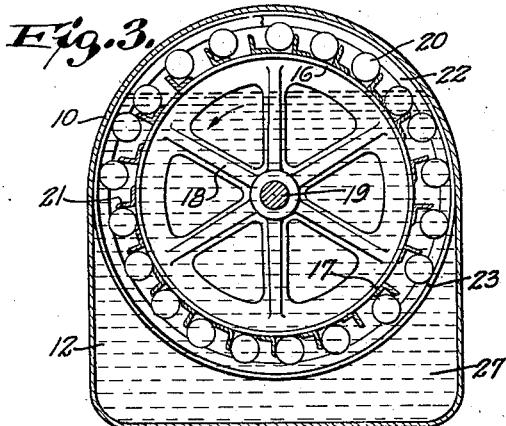
Fig. 3 is a transverse vertical section through the machine, showing the action of the cans when the machine is supplied to a level considerably above the can transporting rotor axis with a mixture of heating liquid having a specific gravity the same as in Fig. 1.
Figure 4:
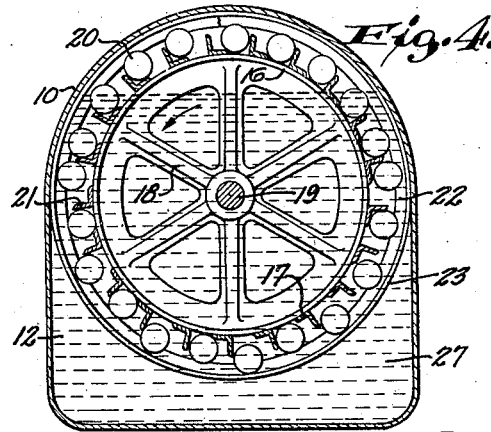
Figure 5:
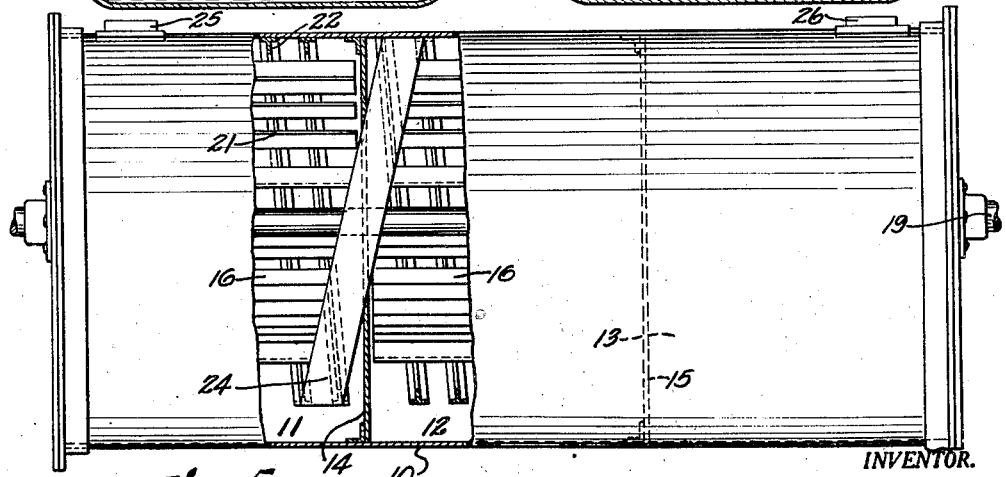

Fig. 4 is a transverse vertical section through the machine, illustrating the action of the cans when the machine is supplied to approximately the same level as in Fig. 3, with a heating liquid having a specific gravity substantially equal to that of the food laden cans; and Fig. 5 is a somewhat diagrammatic part sectional side elevation of the machine with a portion of the main casing broken away in order to show internal structure.

While the improved process will be described herein in connection with a specific type of apparatus of well known construction, it should be understood that it is not contemplated to limit the scope of the invention by such specific disclosure, and that the method is capable of more general exploitation with other forms and types of machines.

In the drawing, the sterilizing or cooking machine specifically illustrated, comprises in general an elongated main casing 10 the interior of which is divided into three successive chambers 11, 12, 13 by means of partitions 14, 15; and a can conveying rotor having successive sections 16 rotatable within the chambers 11, 12, 13 about a common horizontal axis. Each of the rotor sections 16 consists of an annular series of parallel angle bars 17 secured to the periphery of a supporting spider 18, and the several spiders 18 are rotatably mounted upon a common horizontal shaft 19. The successive angle bars 17 are spaced apart laterally a sufficient distance to permit disposition of the cylindrical cans 20 therebetween, and the outer edges of the bar flanges 21 are movable in close proximity to the inner edges of the flanges 22 forming part of the stationary spiral T-shaped guideways 23 which are secured within the main casing 10. The outwardly extending flanges 21 serve to propel the successive cans 20 around the axis of the shaft 19 during rotation of the transporting rotor, and the inwardly projecting spiral flanges 22 coact with the ends of the revolving cans 20 to gradually shift the same longitudinally of the rotor axis. It will be apparent that if the specific gravity of the submerging liquid through which the rotor is adapted to transport the cans, is such that the cans will float into contact with the portion of the rotor beneath the horizontal central plane thereof, the cans 20 will not roll upon the guideways 23 during transportation beneath this plane. If the specific gravity of the liquid is such that the cans 20 sink therein, the cans will be rolled along the guideways 23 throughout the major portion of the submergence. The casing 10 is moreover provided with stationary transfer chutes 24 disposed adjacent to the partitions 14, 15 and these chutes are adapted to transfer the cans in succession from one rotor section 16 to the next, without necessarily producing mixing of the heating liquids confined within the successive chambers 11, 12, 13. One end of the main casing 10 is further provided with a can inlet 25, and the opposite end of the casing is provided with a can outlet 26, both of which are of well known construction.

Each of the successive chambers 11, 12, 13 may be provided with a submerging basin of heating liquid 27, and the liquids in the several chambers may be of the same or of different character and may be disposed at the same or at different levels in the successive basins. The heating liquids 27 in the successive chambers may be heated to any desired temperature, in any suitable manner and one or more of these basins may contain cooled liquid instead of heated liquid. In accordance with the present invention, the treating liquid in the chambers 11, 12, 13 is preferably a solution consisting of predetermined proportions of water and another liquid having relatively high specific gravity. The treating liquid must moreover be non-poisonous when utilized for the treatment of food products, and should also be non-odorous since certain foods are capable of absorbing objectionable odors. When tin cans are employed as containers for the batches of substance being treated, the submerging liquid must not detrimentally affect the metal of the cans, and if several basic liquids are employed, these must not be immiscible to one another.

It has been found that glycerine or glycerol $C_3H_5(OH)_3$, which in fact is also a food, and which has relatively high specific gravity (1.25), is well suited as a basic liquid. Another suitable basic liquid is ethylene glycol, $C_2H_4(OH)_2$ which has a higher specific gravity than water (1.118). The specific gravity of packages such as milk filled tin cans is approximately 1.114, while that of water is unity. It will therefore be apparent that by mixing glycerine, ethylene glycol and water in proper proportions, the treating liquid may be caused to either sink or float the food laden cans, or to maintain the same in substantial balance upon equalization of the specific gravities of the submerging liquid and of the loaded cans. The solution may be readily segregated into its constituents, by distillation, thus permitting re-mixing of the basic liquids and water in order to secure a submerging solution having any desired specific gravity within the limits of the constituents. While these particular basic liquids also have relatively low specific heat and high boiling points, which are advantageous in securing desirable heat transfer, this feature forms the subject matter of a separate application and will be referred to herein only incidentally.

Figure 1:
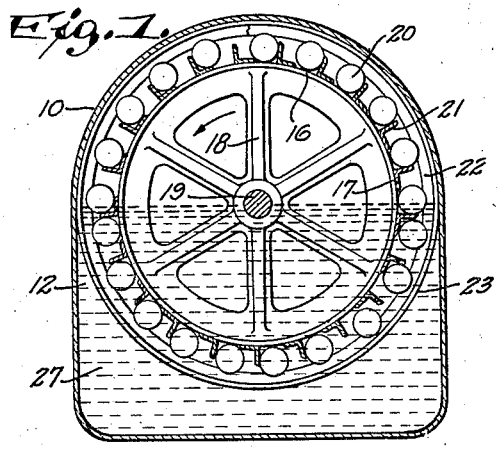
Fig. 1 is a transverse vertical section through a machine for heat treating edible substances packed in cylindrical tin cans, showing the action of the cans when the machine is supplied to approximately the level of the central horizontal axis of the transporting rotor, with a heating liquid having a definite specific gravity.

Now assuming that it is desired to sterilize a substance requiring little or no agitation during the treatment thereof, the solution 27 will be so mixed that the density of the submerging liquid is higher than that of the food laden cans 20, as shown in Fig. 1, thus causing the cans 20 to float into intimate contact with the rotor section 16 during the entire submergence in the liquid basin the level of which is maintained at the central axis of the shaft 19. The only agitation which the cans 20 will be subjected to during operation of the apparatus with the treating liquid thus conditioned, will be that due to revolution of the cans about the rotor axis, and there will be no agitation of the product due to rotation of the cans about their own axes.

Figure 2:
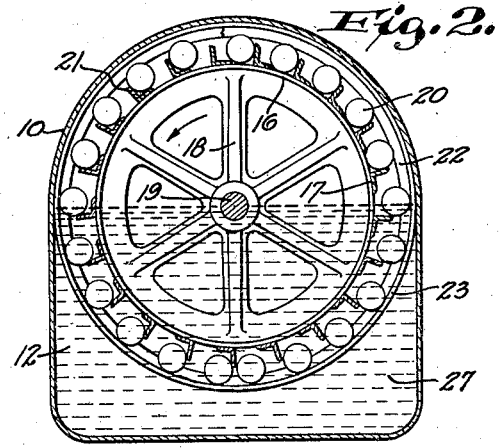
Fig. 2 is a transverse vertical section through the machine, illustrating the action of the cans when the machine is supplied to approximately the horizontal central axis of the rotor with a heating liquid having a different specific gravity.

If the density of the treating liquid 27 is reduced below that of the food laden cans as indicated in Fig. 2, and the level of the liquid is maintained at the central axis of the transporting rotor, then the cans 20 will sink into engagement with the spiral guideway 23 during the entire submerging period and the cans will be doubly agitated due to revolution about the rotor axis and also due to rotation of the cans by rolling along the guideways 23. The cans 20 will not, however, be rotated about their own axes during their passage through the space above the treating liquid.

If the specific gravity or density of the treating liquid is increased so as to float the cans 20, and the level of the treating liquid is raised as shown in Fig. 3, then the food laden cans 20 will be brought into contact with the guideways 23 during a portion of the submergence. As indicated in Fig. 3, the cans upon entering the submerging liquid 27 will be rotated about their own axes until they pass below the central horizontal plane of the rotor axis, whereupon the agitation due to rotation about their own axes will cease until the cans are again carried above said plane. As the cans leave the treating liquid they will again be agitated by rotation about their own axes until they reach the space above the treating liquid.

In Fig. 4, is shown the action of the cans 20 after the specific gravity of the treating liquid 27 and of the food laden cans 20 is equalized. The cans in this case may or may not be agitated during submergence thereof, but are not agitated due to rotation about their own axes during transportation through the space above the treating liquid.

It will be apparent from the foregoing description, that the improved process is readily applicable in the treatment of various species of materials, and that any degree of agitation may be secured by merely varying the proportions of basic liquid and water in the submerging solution so as to secure the desired density of the mixture. The rate of heat penetration or transfer is largely dependent upon the degree of agitation, thus making the present invention especially applicable to heat treatment of products packed in cylindrical containers. The level of the treating liquid may be varied at will to suit various conditions of treatment, and the cans may be maintained submerged within the treating liquid throughout their passage through the machine by merely filling the main casing 10 with treating liquid. The several chambers 11, 12, 13 may be held completely or partially filled with treating liquid 27 having the same or different characteristics, and in some cases it may be desirable to utilize only a single chamber in the treating machine, whereupon the partitions 14, 15 may be removed. When it becomes desirable to change the relative proportions of basic liquid and water contained in the treating medium, the ingredients may be readily separated by distillation and subsequently remixed in the proper portions, thus making the present improved process extremely flexible and adaptable to the treatment of a wide range of materials.

As hereinabove indicated, the process of varying the specific heat and boiling point of the heat treating liquid in order to vary the rate of heat transfer, is being made the subject of a separate application, and this is also true of the combined process of varying the specific heat of the liquid and of varying the degree of agitation to control the rate of heat penetration or transfer.

It should be understood that it is not desired to limit the present invention to the use of the basic liquids herein specifically referred to, since various modifications within the scope of the claims may occur to persons skilled in the art.

It is claimed and desired to secure by Letters Patent:

1. The process of treating edible substance, which comprises, a transporting hermetically sealed batches of the substance through liquid having a predetermined density, and varying the depth of submergence and utilizing the said density to control the degree of agitation of the batches during said transportation.

2. The process of treating edible substance, which comprises, transporting hermetically sealed batches of the substance in succession through liquid having a predetermined density, and varying the depth of submergence and utilizing the said density to control the degree of agitation of the batches during a predetermined portion of said transportation.

3. The process of treating edible substance, which comprises, transporting batches of the substance in succession through a solution of water and other liquid having a specific gravity above unity, and utilizing the said specific gravity to control the degree of agitation of the batches during said transportation.

4. The process of treating edible substance, which comprises, transporting batches of the substance packed in cylindrical containers through a liquid having a specific gravity above unity, and utilizing the said specific gravity to control the degree of rolling of said containers and consequent agitation during said transportation.

5. The process of treating edible substance, which comprises, transporting successive batches of the substance packed in cylindrical containers through a liquid having a specific gravity different from that of the packed batches, and utilizing said difference in specific gravity to control the degree of agitation of said batches by rolling of said containers during said transportation.

6. The process of treating edible substance, which comprises, transporting batches of the substance packed in cylindrical containers around and along a horizontal axis, intermittently submerging the containers during said transportation in a liquid having a specific gravity above unity, and utilizing the said specific gravity to control the degree of agitation of said containers during said transportation.

7. The process of treating edible substance, which comprises, transporting batches of the substance packed in cylindrical containers around and along a horizontal axis and utilizing the said specific gravity intermittently submerging the containers during said transportation in a liquid having a specific gravity above unity, and varying the level of said liquid to control the degree of agitation of said containers during said transportation.

8. The process of treating edible substance, which comprises, transporting batches of the substance packed in cylindrical containers around and along a horizontal axis, intermittently submerging the containers during said transportation in a liquid having a specific gravity above unity, and varying the level of said liquid and utilizing the said specific gravity to control the degree of agitation of said containers during a predetermined portion of said transportation.

9. The process of treating commodity packed in circular containers, which comprises, causing the containers to roll along a surface while immersed in a liquid, and varying the rolling action and hence the degree of agitation of the commodity by varying the density of the liquid.

10. The process of treating commodity packed in circular containers, which comprises, causing the containers to roll along a surface extending into a liquid, and varying the rolling action and hence the degree of agitation of the commodity by varying the density of the liquid and the period of submergence of the containers therein.

In testimony whereof, I affix my signature.

FRANK D. CHAPMAN.